April 22, 1924.
W. D. M. HOWARD
1,490,975
PROCESS OF AND APPARATUS FOR GENERATING A HIGHLY COMBUSTIBLE GASEOUS MIXTURE
Filed June 15, 1918
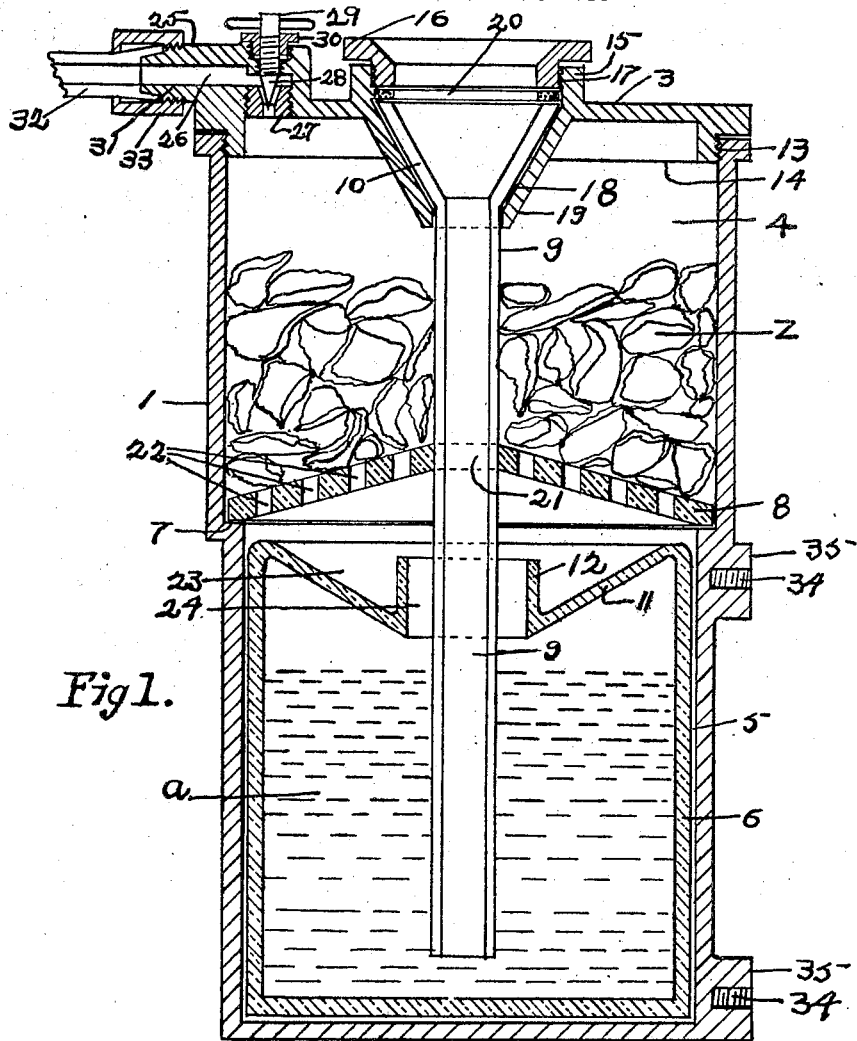
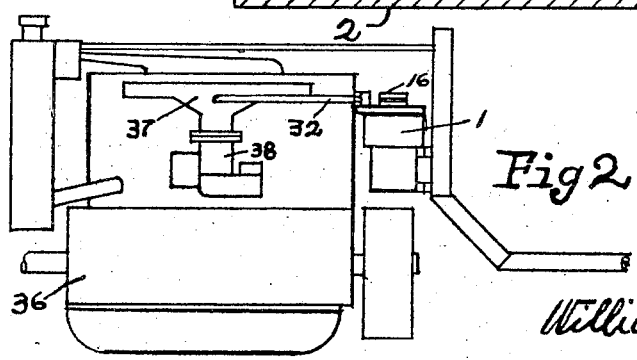
INVENTOR
William D. M. Howard.

Patented Apr. 22, 1924.

1,490,975

UNITED STATES PATENT OFFICE.

WILLIAM DAVIS MERRY HOWARD, OF BOSTON, MASSACHUSETTS.

PROCESS OF AND APPARATUS FOR GENERATING A HIGHLY-COMBUSTIBLE GASEOUS MIXTURE.

Application filed June 15, 1918. Serial No. 240,139.

*To all whom it may concern:*

Be it known that I, WILLIAM DAVIS MERRY HOWARD, a citizen of the United States, and a resident of Boston, county of Suffolk, State of Massachusetts, have invented certain new and useful Improvements in Processes of and Apparatus for Generating a Highly-Combustible Gaseous Mixture, of which the following description, in connection with the accompanying drawing, is a specification, like characters on the drawing representing like parts.

This invention comprises a process of and apparatus for generating a gaseous mixture which is highly combustible and is therefore especially adapted for use in operating internal combustion engines. The process of making the improved mixture consists in commingling with carbureted air a gaseous mixture containing free hydrogen and aqueous vapor. The carbureted air may be produced by means of an ordinary carbureter from any suitable petroleum oil such as crude oil, tops, distillate kerosene, gasolene, etc. The hydrogen and aqueous vapor mixture is produced by causing air to be carried through a body of weak acid, such as weak hydrochloric acid, thereby to produce an acid-laden moist air and then to cause this acid-laden moist air to pass in contact with zinc or some other suitable metal which will chemically combine with the acid to produce hydrogen. The chemical action in thus producing hydrogen develops sufficient heat to convert the moisture in the air into vapor. This resultant mixture of vapor and hydrogen is delivered in proper proportions to the carbureted air thereby producing the desired highly-combustible mixture.

The presence of the hydrogen gas in the gaseous mixture increases the rapidity with which the flame is propagated when the charge is ignited, and hence an internal combustion engine using this gaseous mixture will be more efficient than one using a slower burning charge. Further the combustion of the hydrogen gas raises the temperature of the burning gas and this, together with the presence of the steam which is produced, tends to eliminate the carbon deposit.

In order to give an understanding of my invention I will first describe an apparatus embodying said invention and by which the method may be carried out after which the novel features of the invention will be pointed out in the appended claims.

In the drawings, Fig. 1 is a vertical sectional view of a generator embodying my invention;

Fig. 2 is an elevation view showing the generator assembled in combination with a gas engine and its carbureter.

The generator herein shown comprises a casing 1 which is slightly larger at its upper end than at its lower end thereby to produce the annular shoulder 7. Situated within the lower end of the chamber is a vessel 6 adapted to contain an acid, such, for instance, as hydrochloric acid. I find that the best results are obtained by using a diluted solution of hydrochloric acid $a$.

The vessel 6 is provided with an opening 24 in its upper end and the top 11 of the vessel is preferably made frustro-conical in shape and is provided with the vertical flange 12 surrounding the opening 24. The top of the casing is closed by a cover 3 which is shown as provided with a flange 14 screw-threaded to the casing, as shown at 13. This cover 3 is shaped to provide the conical supporting portion 19 that is adapted to receive the funnel 10 having the elongated delivery pipe 9 depending therefrom which pipe extends through the opening 24 of the vessel 6 and nearly to the bottom thereof. The funnel 10 is retained in the portion 19 by means of the clamping ring run 16 which is screw-threaded to the flange 15 of the cover 3, as shown at 17. A gasket 20 makes a gas-tight connection at this point. The purpose of the funnel 10 and tube 9 is to provide for delivering atmospheric air into the acid $a$, as will be presently described.

Supported on the ledge or shoulder 7 is a plate 8 of glass or other similar acid-proof material which constitutes a support for scraps of metal Z, such, for instance, as zinc. The partition 8 is provided with a central opening 21 through which the tube 9 extends but is also provided with a plurality of apertures 22.

The cover 3 is provided with an outlet opening 26 which is controlled by a needle valve 28 that is adapted to be seated against the valve seat 27. This needle valve is provided with the stem 29 by which it may be operated and a gas tight joint is made by the packing box 30. The cover 3 is provided with a screw-threaded nipple 31 through which the duct 26 extends and this nipple is adapted to be connected to a delivery pipe 32 with a gas-tight joint by means of a clamping nut 33 of usual construction.

In the operation of the generator suction will be applied to the discharge duct 26 thereby causing a sufficient reduction of pressure in the chamber 4 and in the vessel 6 so that atmospheric air will be drawn through the funnel 10 and tube 9 into and through the acid solution a. The air which thus bubbles through the acid solution a will become laden with the acid and with water vapor and thus acid and vapor-laden air will be drawn through the delivery opening 24 of the vessel 6 and up against the plate 8. This plate operates to spread the air out so that it percolates through the apertures 22 and through the mass of zinc scraps Z. The acid in the air chemically reacts on the zinc producing free hydrogen, and this chemical action is accompanied by heat which tends to convert the water in the air into vapor. A gaseous mixture is thus produced containing hydrogen and aqueous vapor and this will be delivered through the discharge duct 26.

The generator is used in connection with an internal combustion engine 36 having an intake manifold 37 leading from a carbureter 38. The delivery pipe 32 is connected to the intake manifold between the engine and the carbureter. When the engine is operating the suction produced therein will cause the carbureter to produce a mixture of atmospheric air and atomized oil which is delivered to the engine through the intake manifold 37. The suction of the manifold 37 also operates as above described to draw atmospheric air through the generator thereby producing the gaseous mixture containing hydrogen and aqueous vapor. This gaseous mixture is delivered to the manifold and is commingled with the carbureted air delivered from the carbureter.

The resultant mixture is highly combustible and well adapted for use in internal combustion engines. The presence of the hydrogen gas in the gaseous mixture causes it to burn more rapidly than a mixture without the hydrogen gas, and this rapid propagation of the flame is advantageous as it increases the efficiency of the engine. Further, the burning of the hydrogen gas tends to raise the temperature of the ignited charge, and this, together with the presence of the steam, tends to eliminate all carbon deposit.

Since the generator is connected to the intake manifold of the engine the suction developed and consequently the amount of air which is drawn through the generator will vary as the operation of the engine varies, and hence a proper combustible mixture will be produced at all times.

I claim:

1. The process of producing a highly combustible fuel mixture for use in internal combustion engines which consists in, first, forming a mixture of atomized hydrocarbon and air, second, forming a mixture containing atmospheric air, free hydrogen and aqueous vapor, and then commingling said mixtures.

2. The process of producing a highly combustible fuel mixture for use in internal combustion engines which consists in, first, forming a mixture of atomized hydrocarbon and air, and then forming a mixture comprising atmospheric air, free hydrogen and heated aqueous vapor, and subsequently commingling said mixtures.

3. The process of producing a highly combustible fuel mixture for use in internal combustion engines which consists in generating a gaseous mixture containing hydrogen and aqueous vapor by passing atmospheric air through a body of acid solution and then carrying said air over zinc, generating a mixture of atmospheric air and hydrocarbon, and then commingling said mixtures.

4. In an apparatus of the class described, the combination with a vessel containing an acid solution which will form hydrogen by its action on certain metal, of a chamber containing scraps of said metal, said chamber being separate from the vessel but in communication therewith, and means to cause air to pass through the acid solution in the vessel and thereby to become laden with said acid and subsequently to pass through the chamber and over the zinc scraps therein whereby hydrogen and aqueous vapor will be generated.

5. The combination with an internal combustion engine having a carbureter and an intake manifold, of a vessel containing acid and provided with a discharge opening, a chamber containing zinc scraps in communication with said discharge opening, means connecting said chamber to the intake manifold of the engine and an air supply pipe leading into the acid mass and terminating below the level thereof whereby the suction in the intake manifold draws air through said acid mass and over the zinc scraps, thereby generating hydrogen which is delivered to the gaseous mixture in the manifold.

6. The combination with an internal combustion engine having a carbureter and an intake manifold leading from the carbureter to the engine cylinder, of means actuated by the suction in said intake manifold to generate and deliver to the manifold a gaseous mixture containing hydrogen and aqueous vapor.

In testimony whereof I have affixed my signature, in presence of two witnesses.

WILLIAM DAVIS MERRY HOWARD.

Witnesses:
 JAMES T. MINCHIN,
 RAY W. DOWNE.